(12) United States Patent
Acosta et al.

(10) Patent No.: US 9,934,016 B1
(45) Date of Patent: Apr. 3, 2018

(54) EXTENSIBLE SOFTWARE RELEASE MANAGEMENT AUTOMATION SERVICE

(71) Applicant: Amazon Technologies, Inc., Seattle, WA (US)

(72) Inventors: Luis Alejandro Acosta, Seattle, WA (US); Nare Alan Hayrapetyan, ReSeattlenton, WA (US); Nathaniel Gaertner, Seattle, WA (US); Kenneth William Exner, Redmond, WA (US); Kai Steffen Gorman, Seattle, WA (US); Karan Kapoor, Seattle, WA (US); Thomas Schmitt, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 43 days.

(21) Appl. No.: 14/869,615

(22) Filed: Sep. 29, 2015

(51) Int. Cl.
*G06F 9/45* (2006.01)
*G06F 9/445* (2018.01)

(52) U.S. Cl.
CPC ...................................... *G06F 8/61* (2013.01)

(58) Field of Classification Search
CPC ................. G06F 8/61; G06F 8/60; G06F 8/65
USPC ........................................................ 717/177
See application file for complete search history.

(56) References Cited

U.S. PATENT DOCUMENTS

| 8,677,315 | B1 | 3/2014 | Anderson et al. | |
| 8,856,291 | B2 | 10/2014 | Bartlett et al. | |
| 2014/0189641 | A1* | 7/2014 | Anderson | G06F 8/60 717/110 |
| 2014/0282353 | A1* | 9/2014 | Jubran | G06F 8/00 717/101 |
| 2016/0191384 | A1* | 6/2016 | Shelar | H04L 69/22 370/392 |

* cited by examiner

*Primary Examiner* — John Chavis
(74) *Attorney, Agent, or Firm* — Robert C. Kowert; Meyertons, Hood, Kivlin, Kowert & Goetzel, P.C.

(57) ABSTRACT

Technologies are disclosed herein for automated software release lifecycle management. In particular, a software release management network service is disclosed that provides functionality for allowing a software developer to automate aspects of a software release pipeline. A software release pipeline can have multiple stages, each of which can have multiple actions. The actions can include internal actions that utilize network services internal to a service provider network. The actions can also include external actions that utilize network services that are external to a service provider network. The internal and external actions can perform various release-related functions, such as obtaining source code, building the source code, deploying built program code, and for performing tests. Stage gates and/or action gates can also be defined for conditional execution of the next stage or action in a software release pipeline, respectively. A gate bypass can also be specified to override stage or action gates.

20 Claims, 10 Drawing Sheets

EXTENSIBLE SOFTWARE RELEASE MANAGEMENT AUTOMATION SERVICE

BACKGROUND

Various network services exist that provide functionality for assisting software developers with aspects of the software release lifecycle. For example, and without limitation, network services exist for providing repositories for source code, for building source code, for performing program tests, and for performing other steps of the typical program development and release lifecycle. Utilizing combinations of these various network services can, however, be complicated and time consuming for software developers.

The disclosure made herein is presented with respect to these and other considerations.

DETAILED DESCRIPTION

Figure 1A:
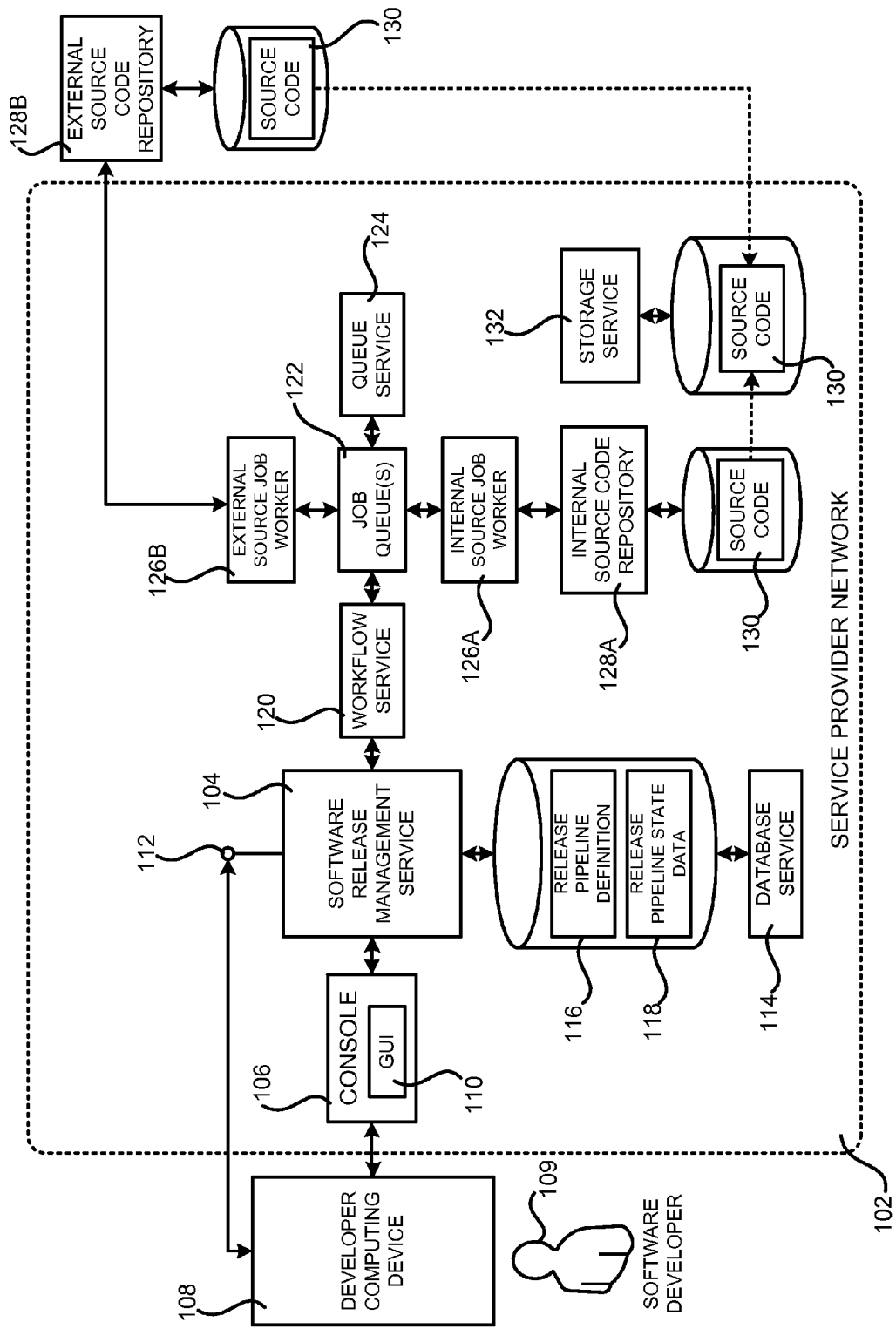
FIGS. 1A-1D are software architecture diagrams showing aspects of the configuration and utilization of a software release management service disclosed herein, according to one particular configuration.

The following detailed description is directed to technologies for managing and automating the software release lifecycle. Through an implementation of the disclosed technologies, software developers can automate the software release lifecycle utilizing a combination of first-party and third-party network services. As a result, various stages of the software release lifecycle can be performed more easily, faster, with fewer errors, and at a lower cost than currently possible. Software developers can, in this way, rapidly deliver software features and updates with high quality through the automation of the software build, test, and deployment processes. Additional technical benefits other than those described briefly above can also be realized through an implementation of the technologies disclosed herein.

In order to enable the functionality disclosed herein, a software release management service is provided in one configuration. The software release management service is a network service that can execute in a service provider network that is configured to provide computing resources on a permanent or an as-needed basis. Among other types of functionality, the computing resources provided by the service provider network can be utilized to implement the various network services described herein. The computing resources provided by the service provider network can include various types of computing resources, such as data processing resources like virtual machine instances, data storage resources, networking resources, data communication resources, network services, and the like.

The software release management service disclosed herein exposes an interface, such as a graphical user interface ("GUI"), a Web services interface, or a command line interface ("CLI"), through which a software developer or other user can define a release pipeline definition. The release pipeline definition is user-specified data that defines a software release pipeline that is to be automated by the software release management service.

The software release pipeline can include one or more stages, such as a source code stage, a beta testing stage, and/or a production stage. Each of the stages can include one or more actions. For example, and without limitation, each stage can include one or more source code actions for obtaining source code from an internal (i.e. internal to the service provider network that implements the software release management service) or an external (i.e. external to the service provider network) source code repository. Each stage can also include one or more build actions for utilizing an internal or external build service to build source code that has been obtained by a source code action. Each stage can also include a test action for testing source or built code utilizing an internal or external testing service. Each stage can also include a deploy action for deploying built code using an internal or external deployment service. The actions in each stage can be executed in parallel, sequentially, or in combinations thereof. Software release pipelines can also include other actions not specifically mentioned herein.

When a software release pipeline is executed, a determination can be made as to whether an internal action or an external action is to be performed. If an internal action is to be performed, an internal job worker associated with the internal action can be executed. The internal job worker is configured to utilize one or more network services within the service provider network to perform the internal action. For example, and without limitation, the internal job worker can be an internal source code job worker that is configured to obtain source code from an internal source code repository and to make the source code available to subsequent actions in the software release pipeline.

The internal job worker can also be an internal build job worker that is configured to obtain the source code and to utilize an internal build service to build the source code. The internal job worker can also be an internal testing service job worker that is configured to utilize an internal testing service to test aspects of the source code or the built code. The internal job worker can also be an internal deployment service job worker that is configured to utilize an internal deployment service to deploy the built code to computing resources, such as virtual machine ("VM") instances. Other types of internal job workers can also be utilized to implement other types of internal actions.

If an external action is to be performed within a software release pipeline, an external job worker associated with the external action can be executed. The external job worker is configured to utilize one or more network services that are external to the service provider network to perform the external action. For example, and without limitation, the external job worker can be an external source code job worker that is configured to obtain source code from an external source code repository and to make the source code available to subsequent actions in the software release pipeline.

The external job worker can also be an external build job worker that is configured to obtain the source code and to utilize an external build service to build the source code. The external job worker can also be an external testing service job worker that is configured to utilize an external testing service to test aspects of the source code or the built code. The external job worker can also be an external deployment service job worker that is configured to utilize an external deployment service to deploy the built code to computing resources, such as VM instances. Other types of external job workers can also be utilized to implement other types of external actions. Additionally, a software release pipeline can combine and utilize both internal and external job workers in various combinations.

In some configurations, a determination can be made as to whether an action in a software release pipeline has failed. For example, one or more of the tests performed on built code by a test action can fail. In this scenario, one or more user-specified actions can be defined and performed in response to determining that an internal or external action has failed. For instance, if a test action fails, the deployment of the program code under test performed by a deploy action in the software release pipeline can be rolled back. In this way, an execution environment can be returned to the state that it was in just prior to the deployment of the code that failed the tests performed by the test action. Other types of user-specified actions can also be performed in response to determining that an internal or an external action has failed.

In some configurations, a release pipeline definition can also specify one or more user-defined action gates and/or stage gates. Action gates define one or more conditions that are to be satisfied before the next action in a release pipeline is to be executed. If an action gate is encountered during execution of the software release pipeline, the conditions associated with the action gate will be evaluated, and the next action in the software release pipeline will be executed, or not, based upon the results of the evaluation.

Stage gates define one or more conditions that are to be satisfied before the next stage in a software release pipeline is to be executed. If a stage gate is encountered during execution of the software release pipeline, the conditions associated with the stage gate will be evaluated, and the next stage in the software release pipeline will be executed, or not, based upon the results of the evaluation.

The action gates and stage gates can be approval gates that specify an approval that is required in order for the next action or stage in the software release pipeline to be executed. The action gates and stage gates can also be time window gates that specify one or more time-based restrictions for permitting the software release pipeline to execute the next stage or action in the software release pipeline. The action and stage gates can also be alarm gates that specify one or more alarms that must not be present in order for the next stage or action in the software release pipeline to be executed. The action and stage gates can also be user-defined gates that specify one or more user-defined conditions that are to be satisfied in order for the next stage or action in the software release pipeline to be executed. Other types of stage and action gates can also be utilized in other configurations.

In some configurations, software developers can also specify a gate bypass for a stage gate or an action gate. When a gate bypass is encountered that is associated with a stage gate, the next stage in the software release pipeline will be executed regardless of the evaluation of the stage gate. Similarly, when a gate bypass is encountered that is associated with an action gate, the next action in the software release pipeline will be executed independently of the evaluation of the action gate. In this way, a developer can manually override action or stage gates on an as-needed basis. Additional details regarding the various components and processes described briefly above for managing and automating the software release lifecycle will be presented below with regard to FIGS. 1A-7.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein can be practiced in distributed computing environments, such as a service provider network, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIGS. 1A-1D are software architecture diagrams showing aspects of the configuration and utilization of a software release management service 104 disclosed herein, according to one particular configuration. As shown in FIG. 1A, the software release management service 104 executes in a service provider network 102 in one particular configuration.

As discussed briefly above, the service provider network 102 is a computing network configured to provide computing resources on a permanent or an as-needed basis. Among other types of functionality, the computing resources provided by the service provider network 102 can be utilized to implement the various network services described herein, such as the software release management service 104. The computing resources provided by the service provider network 102 can include various types of computing resources, such as data processing resources like VM instances, data storage resources, networking resources, data communication resources, network services, and the like.

A customer or potential customer of the service provider network 102 can utilize an appropriate computing system, such as the developer computing device 108, to communicate with the service provider network 102 over an appropriate data communications network (not shown in FIG. 1A). In this way, a customer of the service provider network 102 can configure various aspects of the operation of the computing resources provided by the service provider network 102, or to otherwise control any computing resources being utilized by the customer.

For example, and without limitation, a computing system utilized by a customer of the service provider network 102, such as the developer computing device 108, can be utilized to purchase computing resources in the service provider network 102, to configure aspects of the operation of the computing resources through a management console (not shown in FIG. 1A) or other type of interface, to access and utilize functionality provided by the various services and systems described herein, and/or to perform other types of functionality with regard to the operation of the computing resources provided by the service provider network 102.

The developer computing device 108 can be any type of computing device capable of connecting to the service provider network 102 via a suitable data communications network such as, but not limited to, a laptop or desktop computer, a tablet computing device, a server computer, or a smartphone. Administrative users employed by the operator of the service provider network 102, such as administrators managing the operation of the service provider network 102, can also connect with, manage, and utilize resources provided by the service provider network 102 in a similar fashion. Additional details regarding the configuration and operation of the service provider network 102 will be provided below with regard to FIGS. 4-7.

As discussed briefly above, the service provider network 102 can also be configured to execute various types of network services. For example, and without limitation, the service provider network 102 can execute the software release management service 104 shown in FIG. 1A. As discussed briefly above, the software release management service 104 is a network service that can execute in the service provider network 102 in one particular configuration.

As shown in FIG. 1A, the software release management service 104 exposes an interface, such as a GUI provided by a console 106, a Web services application programming interface ("API") 112, or a CLI (not shown in FIG. 1A), through which a software developer or other user can supply or define a release pipeline definition 116. As discussed briefly above, the release pipeline definition 116 is user-specified data that defines a software release pipeline that is to be automated by the software release management service 104. In one particular configuration, the release pipeline definition 116 is stored in a database provided by a database service 114 executing in the service provider network 102. Other mechanisms can also be utilized to store the release pipeline definition 116.

The developer-defined software release pipeline can include one or more stages, such as a source code stage, a beta testing stage, and/or a production stage. Each of the stages can include one or more actions. For example, and without limitation, each stage can include one or more source code actions for obtaining source code 130 from an internal (i.e. internal to the service provider network 102) source code repository 128A or an external (i.e. external to the service provider network 102) source code repository 128B. Each stage can also include one or more build actions for utilizing an internal build service 134 (shown in FIG. 1B) or an external build service 136 (also shown in FIG. 1) to build source code 130 that has been obtained by a source code action to generate built code 138 (shown in FIG. 1C). Each stage can also include a test action for testing source code 130 or built code 138 (shown in FIG. 1B) utilizing an internal testing service (shown in FIG. 1D) or an external testing service 156 (also shown in FIG. 1D). Each stage can also include a deploy action for deploying built code 138 using an internal deployment service 140 or an external deployment service 142. The actions in each stage can be executed in parallel, sequentially, or in combinations thereof. Software release pipelines can also include other actions not specifically mentioned herein. Additional details regarding the structure and execution of an illustrative software release pipeline will be provided below with regard to FIG. 2.

As shown in FIG. 1A, the software release management service 104 can utilize a workflow service 120 in order to execute the developer-specified software release pipeline. The workflow service 120 is a network service that provides functionality for implementing developer-supplied actions. For example, and without limitation, the workflow service 120 can place messages on one or more job queues 122 for consumption by executable job workers 126 that implement various actions in a software release pipeline. In one configuration, the job queues 122 are provided by a queue service 124, which also executes in the service provider network 102. Additional details regarding the operation of the workflow service 120 and the use of the job queues 122 by the job workers 126 will be provided below.

In general, when a software release pipeline is executed, a determination can be made as to whether an internal action or an external action is to be performed. If an internal action is to be performed, an internal job worker associated with the internal action can be executed. The internal job worker is program code that is configured to utilize one or more network services within the service provider network 102 to perform the internal action. For example, and without limitation, the internal job worker can be an internal source code job worker 126A that is configured to obtain source code 130 from an internal source code repository 128A and to make the source code 130 available to subsequent actions in the software release pipeline. In one particular configuration, the internal source code job worker 126A obtains the source code 130 from the internal source code repository 128A and stores the source code 130 internally to the service provider network 102 utilizing services provided by the storage service 132. The source code 130 can be stored in other locations in other configurations.

If an external action is to be performed within a software release pipeline, an external job worker associated with the external action can be executed. The external job worker is program code that is configured to utilize one or more network services that are external to the service provider network 102 to perform the external action. For example, and without limitation, the external job worker can be an external source code job worker 126B that is configured to obtain the source code 130 from an external source code repository 128B and to make the source code 130 available to subsequent actions in the software release pipeline. In this configuration, the external source code job worker 126B can also utilize the storage service 132 to store the source code 130. The external source code job worker 126B can also store the source code 130 in another location internal or external to the service provider network 102 that is accessible by other job workers.

In order to trigger the execution of the internal source code job worker 126A and the external source code job worker 126B, the workflow service 120 can configure a process to periodically poll the internal source code repository 128A or the external source code repository 128B for changes to the source code 130. If changes to the source code 130 are detected, the workflow service 120 can place an appropriate job on the respective job queue 122 instructing the internal source code job worker 126A or the external source code job worker 126B to retrieve the source code 130 and to store the source code 130 utilizing the storage service 132. Other "push" and/or "pull" mechanisms can also be utilized to detect changes to the source code 130 and to retrieve and store the source code 130 in response to detecting such changes.

Figure 1B:
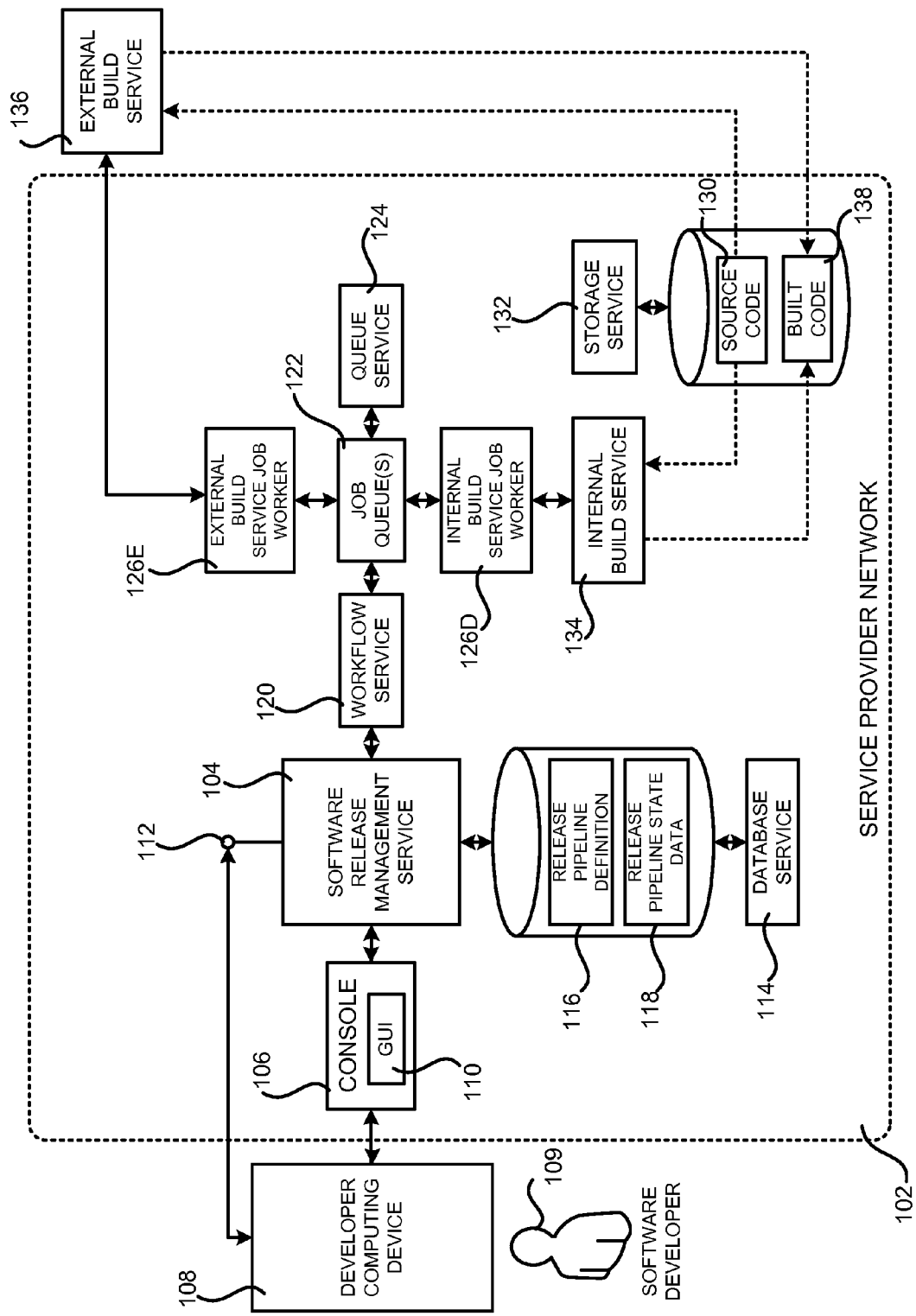

As shown in FIG. 1B, an internal job worker can also be an internal build service job worker 126D that is configured to obtain the source code 130 from the storage service 132 and to utilize an internal build service 134 to build the source code 130 to generate built code 138. In a similar fashion, an external job worker can also be an external build service job worker 126E that is configured to obtain the source code 130 from the storage service 132 and to utilize an external build service 136 to build the source code 130. The built code 138 can also be stored by the storage service 132 in a manner that makes the built code 138 accessible to subsequent software release pipeline actions.

As with the source job workers 126 described above, appropriate messages can be placed on the proper queues 122 in order to instruct the build service job workers 126 to obtain the source code 130 and to provide the source code to the proper build service. For example, messages can be placed on the appropriate queue 122 in response to the completion of the source code job workers 126. In this manner, the execution of software release pipeline actions can be triggered by the successful completion of other actions. In this regard, it can be appreciated that various types of data regarding the current state of a software release pipeline can be stored by the database service 118 as release pipeline state data 118. The release pipeline state data 118 can include data regarding the state of each action, the state of the entire software release pipeline, and/or other types of information. The release pipeline state data 118 can be made available not only to the software release management service 104, but also to the workflow service 120, the various internal and external job workers, and/or or other services not specifically mentioned herein.

Figure 1C:
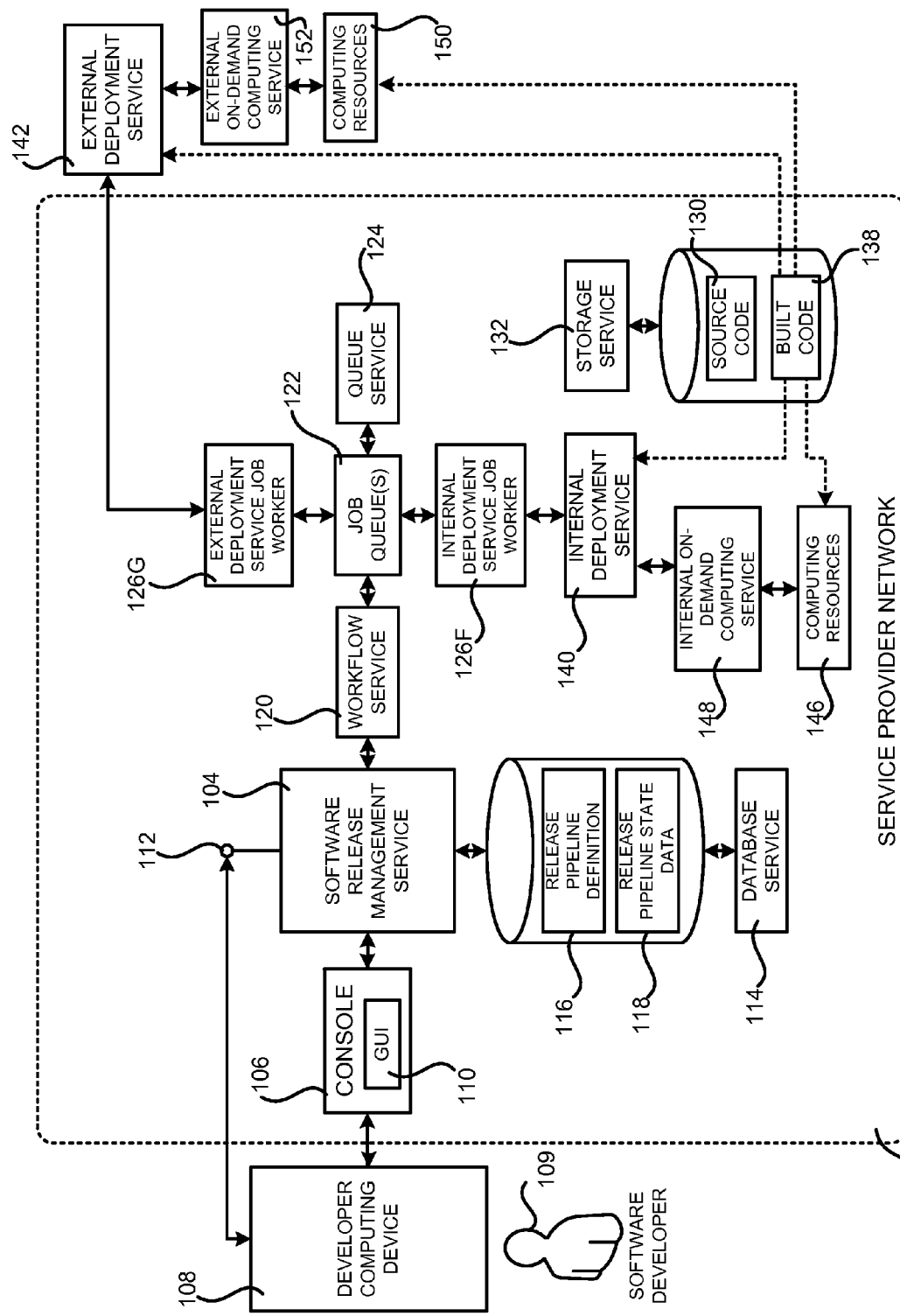

As shown in FIG. 1C, the internal job worker can also be an internal deployment service job worker 126F that is configured to utilize an internal deployment service 140 to deploy the built code 138 to computing resources 146 within the service provider network 102, such as VM instances. The computing resources 146 can be provided, for example, by an internal on-demand computing service 148 that is configured to provide computing resources 146, such as VM instances, to customers on an as-needed basis. Additional details regarding the configuration and operation of an illustrative on-demand computing service will be provided below with regard to FIG. 6.

As also shown in FIG. 1C, an external job worker can also be an external deployment service job 126G worker that is configured to utilize an external deployment service to 142 deploy the built code 138 to computing resources, such as VM instances. In this example, the external deployment service job worker 126G causes the external deployment service 142 to deploy the built code 138 to computing resources 150 provided by an external on-demand computing service 152. In this regard, it should be appreciated that the external deployment service job worker 126G can also be configured to utilize an external deployment service 142 to deploy built code 138 to computing resources 146 provided by the internal on-demand computing service 148. In a similar fashion, the internal deployment service job worker 126F could utilize the internal deployment service 140 to deploy the built code 138 to computing resources 150 provided by the external on-demand computing service 152. Additionally, the deployment service job workers can be triggered by the successful completion of a testing service job worker (described below) or a source code job worker.

Figure 1D:
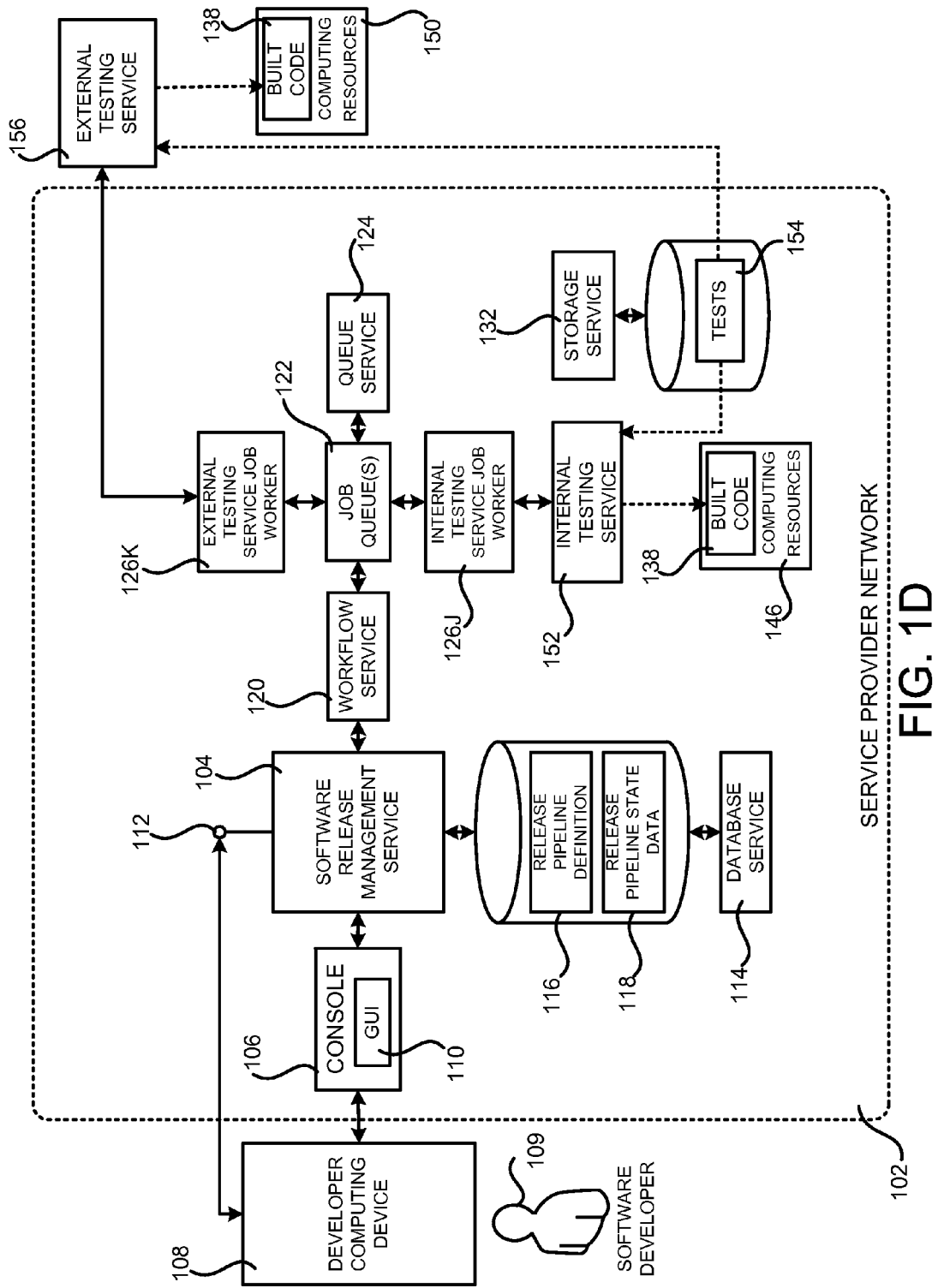

As shown in FIG. 1D, an internal job worker can also be an internal testing service job worker 126J that is configured to utilize an internal testing service 152 to test aspects of the source code 130 and/or the built code 138. For instance, in the example shown in FIG. 1D, the internal testing service job worker 126J is configured to obtain the tests 154 from the storage service 132 and to provide the tests to the internal testing service 152 for use in testing the built code 138. Tests 154 can be obtained and utilized to test source code 130 prior to deployment.

As also shown in FIG. 1D, an external job worker can also be an external testing service job worker 126K that is configured to obtain the tests 154 and utilize an external testing service 156 to perform the tests 154 on the built code 138. The external testing service 156 can also be utilized to perform the tests 154 on the source code 130 in other configurations. The internal testing service job worker 126J and the internal testing service job worker 126K can be triggered by the successful completion of a source code job worker or a deployment service job worker.

It should be appreciated that the various types of software release pipeline actions and corresponding job workers described above are merely illustrative. Other types of internal job workers can also be utilized to implement other types of internal actions. Likewise, other types of external job workers can also be utilized to implement other types of external actions. For example, and without limitation, a software developer can implement an internal job worker or an external job worker to trigger functions or to execute other arbitrary types of code.

In some configurations, for example, a software developer 109 can define custom action types and supply corresponding internal or external job workers. These action types can be kept private to the software developer 109 or made available to other developers. As will be described in greater detail below with regard to FIG. 2, a software release pipeline can combine and utilize both internal and external job workers in various combinations.

In some configurations, various types of actions can be defined and performed in response to the failure of an action in a software release pipeline. For example, one or more of the tests performed on the built code 138 by the testing service job worker 126 corresponding to a test action can fail. In this scenario, one or more user-specified actions can be defined and performed in response to determining that an internal or external action has failed. For instance, if a test action fails, the deployment of the built code 138 that failed the testing pipeline can be rolled back (e.g. from the computing resources 146 or 150 to which it was deployed). In this way, an execution environment can be returned to the state that it was in just prior to the deployment of the built code 138 that failed the tests performed by the test action. Other types of user-specified actions can also be performed in response to determining that an internal or an external action has failed.

As described briefly above, in some configurations a release pipeline definition 116 can also specify one or more user-defined action gates and/or stage gates (not illustrated in FIGS. 1A-1D). Action gates define one or more conditions that are to be satisfied before the next action in a software release pipeline is to be executed. If an action gate is encountered during execution of the software release pipeline, the conditions associated with the action gate will be evaluated, and the next action in the software release pipeline will be executed, or not executed, based upon the results of the evaluation.

Stage gates define one or more conditions that are to be satisfied before the next stage in a software release pipeline is to be executed. If a stage gate is encountered during execution of the software release pipeline, the conditions associated with the stage gate will be evaluated, and the next stage in the software release pipeline will be executed, or not, based upon the results of the evaluation.

The action gates and stage gates can be approval gates that specify an approval that is required in order for the next action or stage in the software release pipeline to be executed. The action gates and stage gates can also be time window gates that specify one or more time-based restrictions for permitting the software release pipeline to execute the next stage or action in the software release pipeline. The action and stage gates can also be alarm gates that specify one or more alarms that must not be present in order for the next stage or action in the software release pipeline to be executed. The action and stage gates can also be user-defined gates that specify one or more user-defined conditions that are to be satisfied in order for the next stage or action in the software release pipeline to be executed. Other types of stage and action gates can also be utilized in other configurations. Additional details regarding the utilization of stage and action gates will be described in greater detail below with regard to FIGS. 2 and 3.

As also described briefly above, in some configurations a software developer 109 can also specify a gate bypass for a stage gate or an action gate. For example, and without limitation, the GUI 110 can provide functionality for allowing a developer 109 to specify a gate bypass. When a gate bypass is encountered that is associated with a stage gate, the next stage in the software release pipeline will be executed regardless of the evaluation of the stage gate. Similarly, when a gate bypass is encountered that is associated with an action gate, the next action in the software release pipeline will be executed independently of the evaluation of the action gate. In this way, a developer 109 can manually override action or stage gates on an as-needed basis.

In some configurations, an audit trail is stored that includes data describing the processing of a gate or action bypass including, but not limited to, data identifying the individual that requested the bypass, the time the bypass was requested, and/or other types of data. Additional details regarding the operation of a stage gate bypass and an action gate bypass will be provided below with regard to FIGS. 2 and 3.

Figure 2:
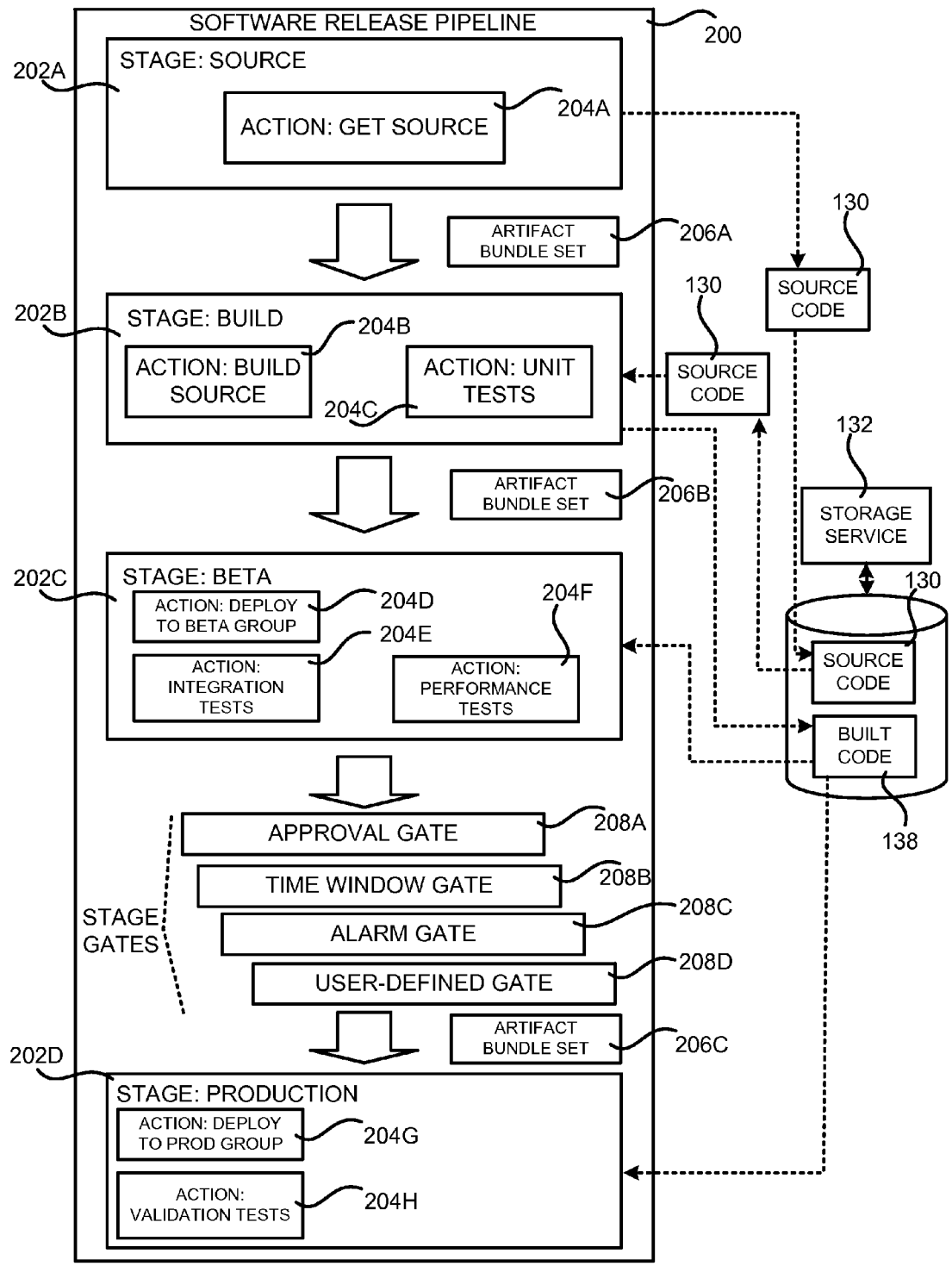
FIG. 2 is a data flow and process diagram illustrating additional aspects of the software release management service disclosed herein in the context of a sample software release pipeline, according to one configuration disclosed herein.

FIG. 2 is a data flow and process diagram illustrating additional aspects of the software release management service 104 disclosed herein in the context of a sample software release pipeline 200, according to one configuration disclosed herein. In the example shown in FIG. 2, the release pipeline definition 116 defines a software release pipeline 200 that includes four stages 202A-202D. The stage 202A includes a single get source action 204A. As discussed above, the get source action 204A can execute an internal source code job worker 126A to obtain the source code 130 from an internal source code repository 128A. Alternately, the get source action 204A can execute an external source code job worker 126B to obtain the source code 130 from the external source code repository 128B. The get source action 204A can also cause the obtained source code 130 to be stored by the storage service 132 or in another location that is accessible to other actions.

As shown in FIG. 2, actions 204 can provide data to other actions in the form of an artifact bundle set 206 (which might also be referred to herein as an "artifact" or "artifacts"). The artifact bundle set 206 is a versioned named reference to artifacts, such as source code 130 or built code 138, utilized by the actions 204. For instance, in the example shown in FIG. 2, the artifact bundle set 206A can include a reference to the location of the source code 130 in the storage service 132. In this way, subsequent actions, such as the actions 204B and 204C, can obtain the source code 130.

In the example shown in FIG. 2, the source stage 202A includes only a single action 204A. Once the action 204A has completed, execution of the software release pipeline 200 will continue to the build stage 202B. The build stage 202B has two actions: a build source action 204B and a unit test action 204C. The build source action 204B utilizes the internal build service job worker 126D or the external build service job worker 126E to build the source code 130 and to generate built code 138. As discussed above, the built code 138 can also be stored using the storage service 132.

In the example shown in FIG. 2, the unit test action 204C is also performed during the build stage 202B. The unit test action 204C utilizes the internal testing service job worker 126J or the external testing service job worker 126K to perform unit tests on the source code 130. The unit test action 204C and the build source action 204B can be performed in parallel. If both the unit test action 204C and the build source action 204B complete successfully, then execution of the software release pipeline 200 can continue to the beta stage 202C. In this case, the artifact bundle set 206B will be passed to the beta stage 202C. The artifact bundle set 206B can include data identifying the location of the built code 138 in the storage service 132, for example. If either the unit test action 204C or the build source action 204B fail, execution of the software release pipeline 200 will stop and one or more user defined-actions can be performed.

In the example shown in FIG. 2, the beta stage 202C has three actions: the deploy action 204D, the test action 204E, and the test action 204F. In this example, the deploy action 204D and the test action 204E are defined for sequential execution. The test action 204F is defined for parallel execution with the test action 204E. In this regard, it should be appreciated that various combinations of parallel and sequential execution can be defined and utilized within a software release pipeline 200. Additionally, although not illustrated in FIG. 2, an action gate can be defined in between any two actions 204 that execute sequentially. As discussed above, a condition associated with the action gate can be evaluated, and the next action can be executed, or not executed, based upon the results of the evaluation. As also discussed above, action gates can include, but are not limited to, approval action gates, time window action gates, alarm action gates, and/or user-defined action gates.

In the beta stage 202C, the deploy action 204D is configured to deploy the built code 138 to a set of computing resources designated for use in beta testing the built code 138. For example, and without limitation, a fleet of VM instances provided by the internal on-demand computing service 148 or the external on-demand computing service 152 can be utilized to execute the built code 138 and to test various aspects of its execution prior to deployment to a production environment. Once the deployment has been completed, the test action 204E and the test action 204F can be utilized to perform integration and performance tests, respectively, on the deployed built code 138 in the manner described above with regard to FIG. 1D.

In the example shown in FIG. 2, four stage gates 208A-208D have also been defined in the software release pipeline 200. In particular, an approval stage gate 208A has been defined that requires approval before the next stage 202D will be executed. For example, and without limitation, the developer 109 may be required to expressly provide their approval through the GUI 110 before the next stage 202D will be executed. Other types of interfaces can also be utilized in order to obtain the approval required by the approval stage gate 208A. In some configurations, an audit trail is stored that includes data describing the provided approval including, but not limited to, data identifying the individual that provided the approval, the time the approval was provided, and/or other types of data.

A time window stage gate 208B has also been defined in the software release pipeline 200. The time window stage gate 208B specifies one or more time-based conditions that must be satisfied before the next stage 202D will be executed. For example, and without limitation, the time window stage gate 208B might require that the current time be later than 12:00 pm before the next stage 202D will be executed. The time window stage gate 208B can also provide other time-based conditions that must be satisfied before the next stage 202D in a software release pipeline 200 will be executed.

An alarm stage gate 208C has also been defined in the software release pipeline 200. The alarm stage gate 208C identifies one or more alarms that must not be present in order for execution of the software release pipeline 200 to proceed to the next stage 202D. The alarm, or alarms, defined by the alarm stage gate 208C can be associated with various services executing in the service provider network 102. For example, and without limitation, the alarm stage gate 208C might specify that the next stage 202D is not to be executed if there are alarms present with respect to the internal on-demand computing service 148 or the computing resources 146. Other types of alarm conditions might also be specified.

A user-defined stage gate 208D has also been defined in the example software release pipeline 200 shown in FIG. 2. As mentioned above, the user-defined stage gate 208D can specify one or more user-defined conditions that must be satisfied before execution of the software release pipeline 200 will proceed to the next stage 202D. In this regard, it should be appreciated that the various stage gates 208 described above are merely illustrative and that conditions other than those described particularly herein can be utilized to prevent execution of a software release pipeline 200 from proceeding from one stage 202 to the next.

If all of the stage gates 208A-208D are clear, execution of the example software release pipeline 200 shown in FIG. 2 will proceed to the production stage 202D. An artifact bundle set 206C can be provided to the actions in stage 202D that identifies the location of the built code 138 in the storage service 132. As shown in FIG. 2, the production stage 202D includes a deploy action 204G and a test action 204H that are to be executed sequentially. The deploy action 204G deploys the built code 138 to a set of computing resources designated for use in production. For example, and without limitation, a fleet of VM instances provided by the internal on-demand computing service 148 can provide a production execution environment for the built code 138. In a production execution environment, the built code 138 can receive and process live customer network traffic. Once the deployment has been completed by the deploy action 204G, the test action 204H can be utilized to perform validation tests on the deployed built code 138 in the manner described above with regard to FIG. 1D. The execution of the software release pipeline 200 ends following the completion of the test action 204H.

It should be appreciated that the example software release pipeline 200 shown in FIG. 2 is merely illustrative and that more or fewer stages 202 and more or fewer actions 204 in each stage 202 can be defined and executed in other configurations. Additionally, more or fewer action gates and stage gates 208 can also be defined and utilized in other configurations. The example software release pipeline 200 shown in FIG. 2 should not, therefore, be seen as limiting the disclosure presented herein to any particular configuration.

Figure 3:
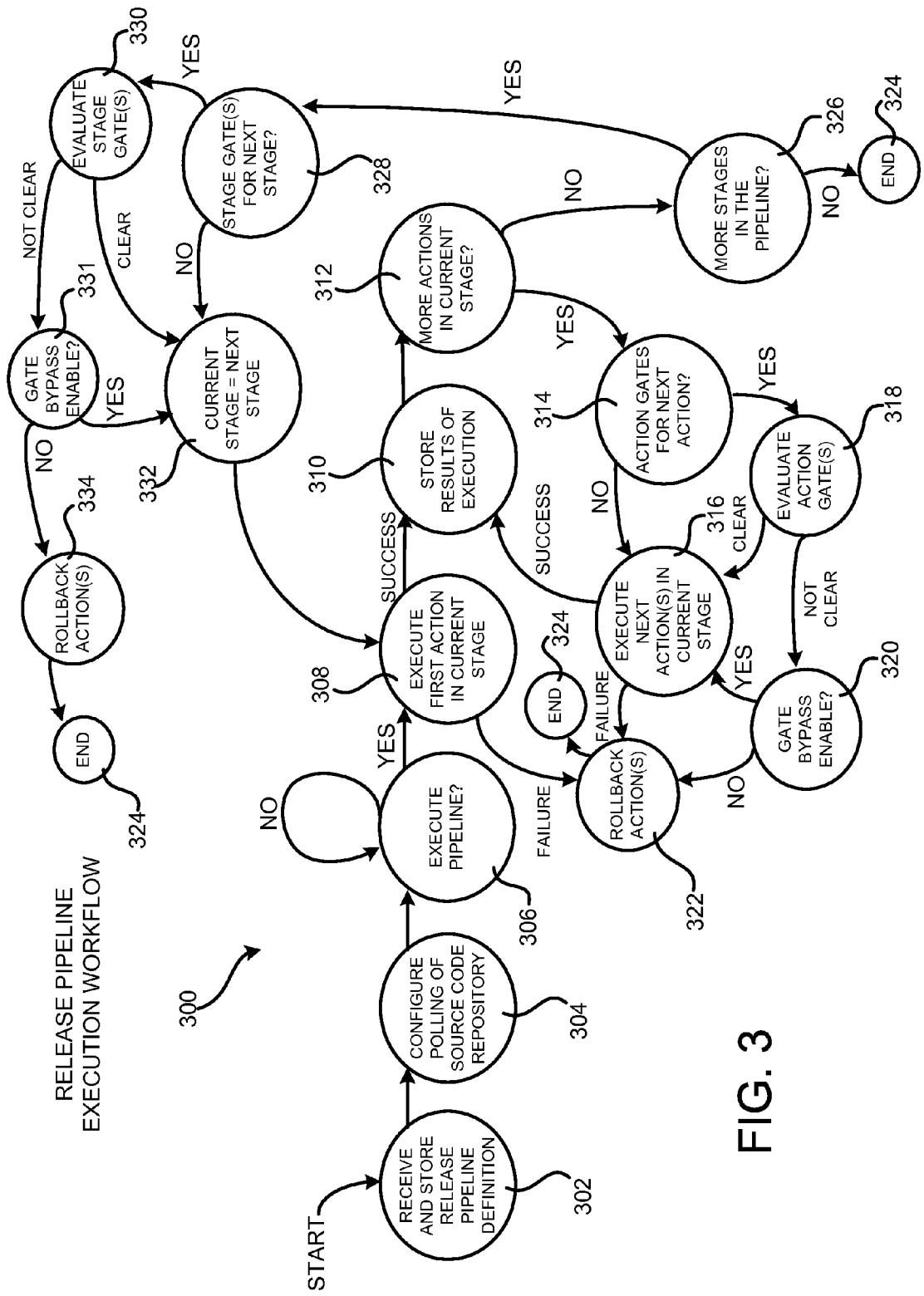
FIG. 3 is a state diagram showing additional aspects of the operation of the mechanism described above with regard to FIGS. 1A-1D and FIG. 2 for implementing a release pipeline execution workflow, according to one particular configuration disclosed herein.

FIG. 3 is a state diagram showing additional aspects of the operation of the mechanism described above with regard to FIGS. 1A-1D and FIG. 2 for implementing a release pipeline execution workflow, according to one particular configuration disclosed herein. It should be appreciated that the logical operations described herein with respect to FIG. 3, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

The state machine 300 begins at state 302, where the software release management service 104 receives the release pipeline definition 116. As discussed above, an appropriate GUI 110 can be provided through which a software developer 109 can define the release pipeline definition 116. As also discussed above, other mechanisms, such as the API 112 or a CLI, can also be provided for defining the release pipeline definition 116. In this regard, it should be appreciated that the software release management service 104 can expose APIs for obtaining other types of data and/or performing other types of functions. For example, and without limitation, an API can be exposed through which other services can obtain the status of workflows, stages, or actions. For instance, data can be obtained regarding whether an action has succeeded, failed, is in-progress, or has not yet been executed. Other types of data can also be maintained and exposed via a suitable network services API or other mechanism.

In some configurations, the GUI 110 also provides functionality for visualizing the status of a release pipeline in near or real-near time. For example, and without limitation, the GUI 110 can include user interface elements showing the status of the execution of a release pipeline, the success and/or failure of actions and/or stages in a release pipeline, approval that has been provided in response to approval gates, bypasses that have been specified for action and/or stage gates, and/or other types of data relating to the execution of a release pipeline.

From state 302, the state machine 300 proceeds to state 304 where a mechanism can be configured and utilized in the manner described above to poll an internal source code repository 128A or an external source code repository 128B for changes to the source code 130. As mentioned above, a "push" mechanism can also be utilized in order to notify the workflow service 120 that a change has been made to the source code 130. From state 304, the state machine 300 proceeds to state 306.

At state 306, a determination is made as to whether the software release pipeline 200 is to be executed. As discussed above, for example, the software release pipeline 200 can be executed in response to detecting a change in the source code 200. The software release pipeline 200 can also be executed in response to a manual request from the developer 109, such as through the GUI 110, or might be executed based upon a pre-defined execution schedule. Other stimuli can also trigger execution of the software release pipeline 200. If the software release pipeline 200 is to be executed, the state machine 300 proceeds from state 306 to state 308.

At state 308, the first action 204 in the first stage 202 of the software execution pipeline 200 is executed. For example, and as discussed above, the appropriate job worker associated with the action 204 can be executed. If the job worker completes execution successfully, the state machine 300 proceeds to state 310, where the results of the execution of the job worker can be stored. For example, if the action 204 is a source code action, the source code 130 can be obtained and stored using the storage service 132. If the execution of the action 204 (i.e. the job worker) fails, the state machine 300 proceeds from state 308 to state 322, where one or more user-defined actions can be performed. For example, and without limitation, an execution environment can be rolled back to the state it was in just prior to the deployment of built code 138. Other types of actions can also be performed. From state 322, the state machine 300 proceeds to state 324, where it ends.

From state 310, the state machine 300 proceeds to state 312, where the workflow service 120 makes a determination as to whether there are any additional actions 204 in the current stage 202. If there are additional actions 204 in the current stage 202, the state machine 300 proceeds to state 314, where a determination is made as to whether there are any action gates prior to the next action 204. If no action gates exist prior to the next action 204, the state machine 300 proceeds to state 316, where the next action 204 in the software release pipeline 200 is executed. From state 316, the state machine 300 proceeds to state 310, described above.

If, at state 314, a determination is made that there are one or more action gates prior to the next action 204, the state machine 300 proceeds to state 318, where the action gates are evaluated. If the action gates are clear (i.e. all of the specified conditions are satisfied), the state machine 300 proceeds from state 318 to state 316, where the next action 203 in the current stage 202 is executed. If all of the action gates are not clear (i.e. all of the specified conditions have not been met), the state machine 300 proceeds from state 318 to state 320.

At state 320, a determination is made as to whether an action gate bypass has been specified for the current action gate. If so, the state machine 300 proceeds from state 320 to state 316, where the next action 204 in the current stage 202 of the software release pipeline 200 is executed. If not, the state machine 300 proceeds from state 320 to state 322, where one or more user-specified actions can be performed, such as rolling back the installation of program code. Other types of actions can also be performed. For example, and without limitation, a notification can be provided to the software developer 109 or another user, a specified network service can be called, and/or a dashboard provided by the GUI 110 can be updated to reflect the failure of an action.

If, at state 312, the workflow service 120 determines that no further actions 204 exist in the current stage 202 of the software release pipeline 200, the state machine 300 proceeds from state 312 to state 326. At state 326, a determination is made as to whether there are additional stages 202 in the software release pipeline 200. If no additional stages 202 exist in the software release pipeline, the state machine 300 proceeds from state 326 to state 324, where it ends. If additional stages 202 do exist, the state machine 300 proceeds from state 326 to state 328.

At state 328, the workflow service 120 determines whether one or more stage gates 208 exist prior to the next stage 202 in the software release pipeline 200. If no stage gates 208 are present, the routine 300 proceeds from state 328 to state 332, where the current stage 202 being executed is set to the next stage 202 in the software release pipeline 200. This information, for example, might be updated in the release pipeline state data 118. The state machine 300 then proceeds from state 332 to state 308, described above, where the actions 204 in the next stage 202 in the software release pipeline 200 can be executed in the manner described above.

If, at state 328, it is determined that stage gates 208 are present prior to the next stage 202, the state machine 300 proceeds from state 328 to state 330, where the stage gates 208 are evaluated. If the stage gates 208 are clear, the state machine 300 proceeds from state 330 to state 332, where the actions 204 in the next stage 202 can be executed in the manner described above. If the stage gates 208 are not clear, the state machine 300 proceeds from state 331 where a determination is made as to whether a gate bypass has been requested for the stage gates. If so, the state machine 300 proceeds from state 331 to state 332, described above. If not, the state machine 300 proceeds from state 331 to state 334, where one or more user-defined actions can be performed, such as rolling back a deployment of program code. Other types of actions can also be performed. From state 334, the state machine 300 proceeds to state 324, where it ends.

Figure 4:
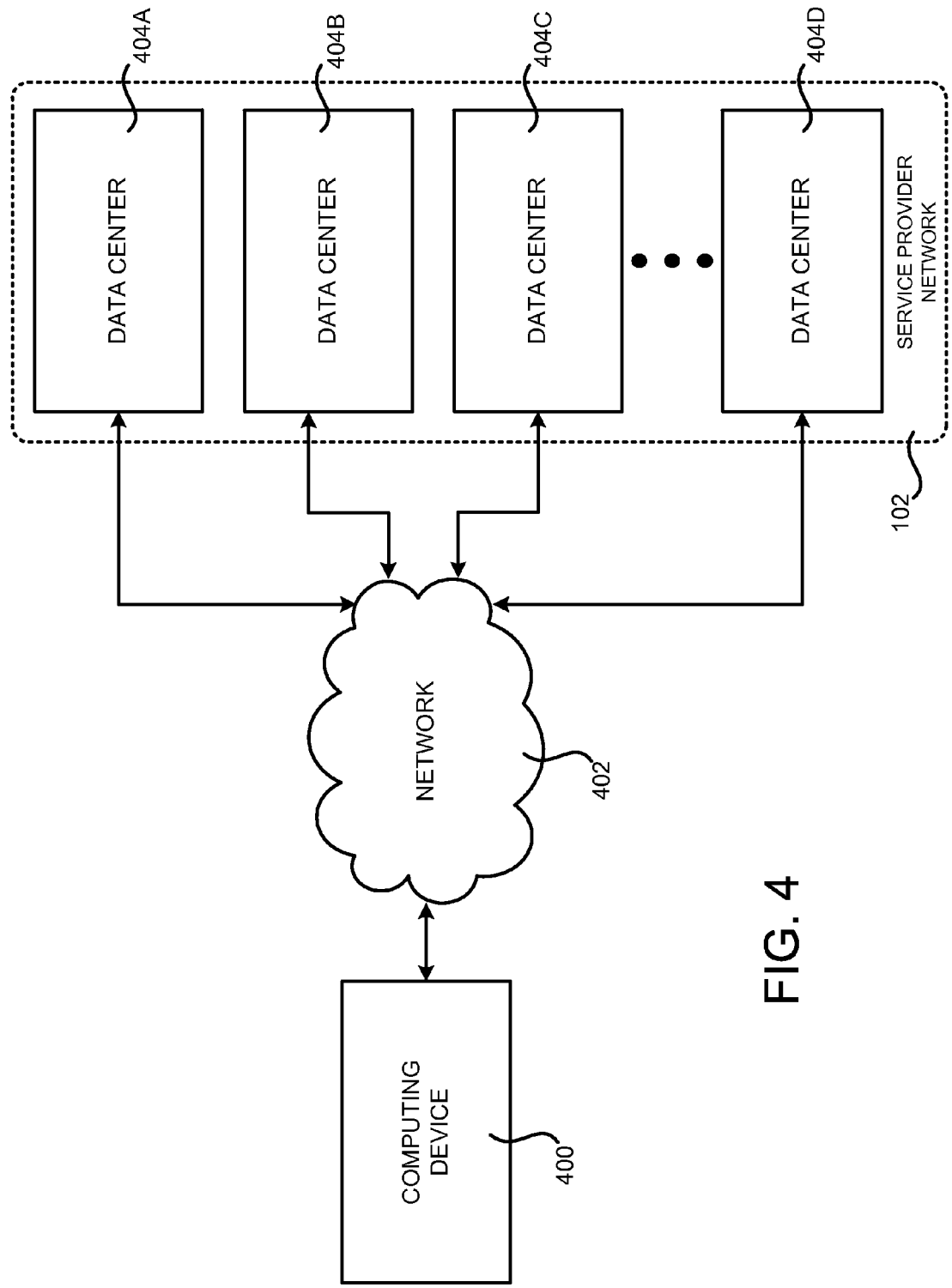
FIG. 4 is a system and network diagram that shows an illustrative operating environment that includes a service provider network that can be configured to implement aspects of the functionality described herein.

FIG. 4 is a system and network diagram that shows one illustrative operating environment for the configurations disclosed herein that includes a service provider network 102 that can be configured to provide functionality for managing and automating aspects of the software release lifecycle in the manner described above, according to one configuration disclosed herein. As discussed above, the service provider network 102 can execute network services that provide computing resources on a permanent or an as-needed basis. Among other types of functionality, the computing resources provided by the service provider network 102 can be utilized to implement the various network services described herein. As also discussed above, the computing resources provided by the service provider network 102 can include various types of computing resources, such as data processing resources like VM instances, data storage resources, networking resources, data communication resources, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including Web servers, application servers, media servers, database servers, some or all of the network services described above, and/or other types of programs. Data storage resources can include file storage devices, block storage devices, and the like. The service provider network 102 can also be configured to provide other types of computing resources not mentioned specifically herein.

As also discussed above, the computing resources provided by the service provider network 102 are enabled in one implementation by one or more data centers 404A-404D (which might be referred herein singularly as "a data center 404" or in the plural as "the data centers 404"). The data centers 404 are facilities utilized to house and operate computer systems and associated components. The data centers 404 typically include redundant and backup power, communications, cooling, and security systems. The data centers 404 can also be located in geographically disparate locations. One illustrative configuration for a data center 404 that can be utilized to implement the technologies disclosed herein will be described below with regard to FIG. 5.

The customers and other users of the service provider network 102 can access the computing resources provided by the service provider network 102 over a network 402, which can be a wide area communication network ("WAN"), such as the Internet, an intranet or an Internet service provider ("ISP") network or a combination of such networks. For example, and without limitation, a computing device 400 operated by a customer or other user of the service provider network 102, such as the developer computing device 108, can be utilized to access the service provider network 102 by way of the network 402. It should be appreciated that a local-area network ("LAN"), the Internet, or any other networking topology known in the art that connects the data centers 404 to remote customers and other users can be utilized. It should also be appreciated that combinations of such networks can also be utilized.

Figure 5:
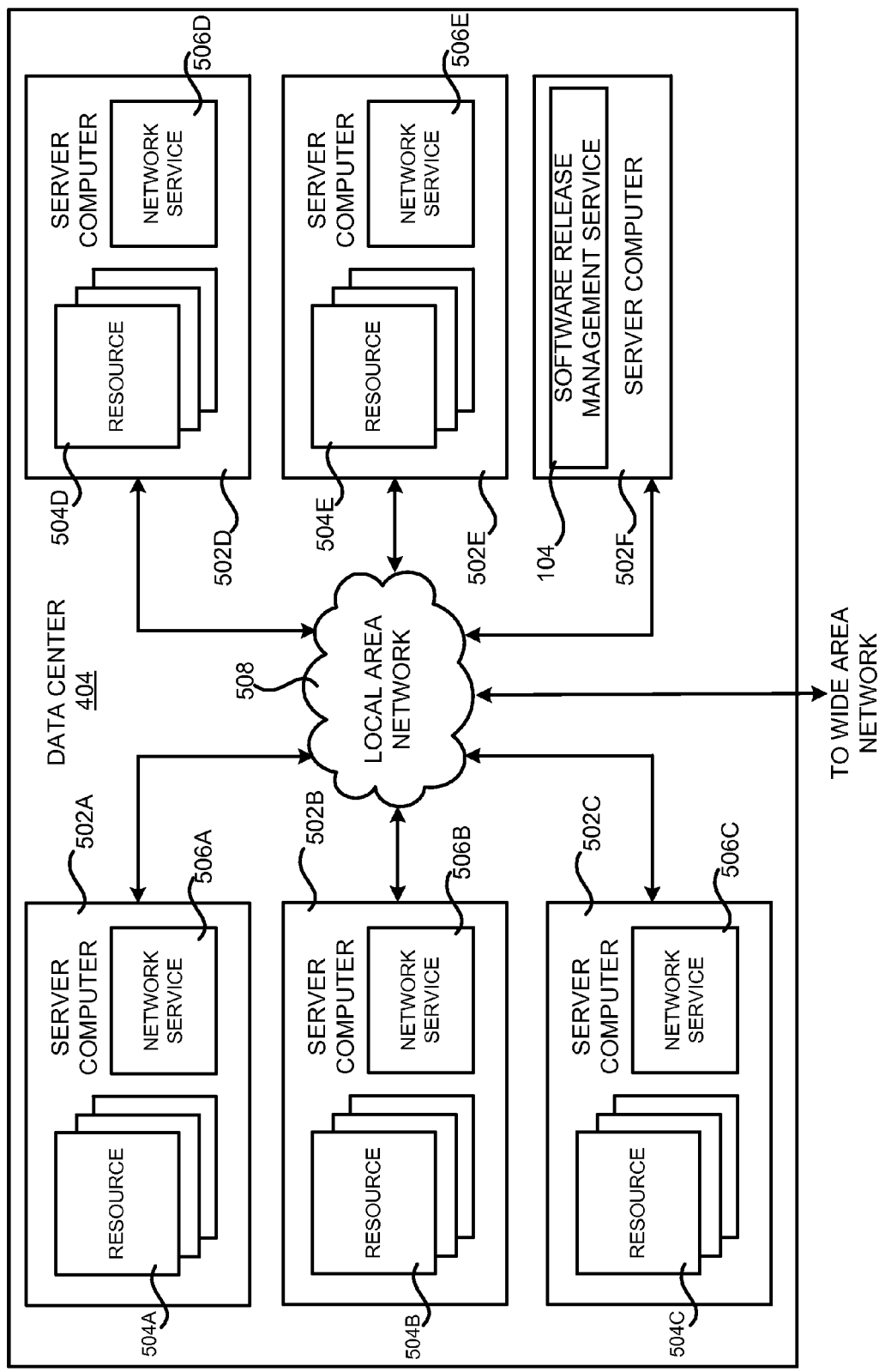
FIG. 5 is a computing system diagram illustrating a configuration for a data center that can be utilized to implement aspects of the technologies disclosed herein.

FIG. 5 is a computing system diagram that illustrates one configuration for a data center 404 that implements aspects of the technologies disclosed herein for managing and automating aspects of the software release lifecycle. The example data center 404 shown in FIG. 5 includes several server computers 502A-502F (which might be referred to herein singularly as "a server computer 502" or in the plural as "the server computers 502") for providing the computing resources 504A-504E.

The server computers 502 can be standard tower, rackmount, or blade server computers configured appropriately for providing the computing resources 504 described herein (illustrated in FIG. 5 as the computing resources 504A-504E). As mentioned above, the computing resources 504 provided by the service provider network 102 can be data processing resources such as VM instances or hardware computing systems, data storage resources, database resources, networking resources, and others. Some of the servers 502 can also be configured to execute network services 506A-506E, respectively, capable of instantiating, providing and/or managing the computing resources 504, some of which are described in detail below with regard to FIG. 6.

The data center 404 shown in FIG. 5 also includes a server computer 502F that can execute some or all of the software components described above. For example, and without limitation, the server computer 502F can be configured to execute the software release management service 104, which was described in detail above. The server computer 502F can also be configured to execute other components and/or to store data for providing some or all of the functionality described herein. In this regard, it should be appreciated that components or different instances of the software release management service 104 can execute on many other physical or virtual servers in the data centers 404 in various configurations.

In the example data center 404 shown in FIG. 5, an appropriate LAN 508 is also utilized to interconnect the server computers 502A-502F. The LAN 508 is also connected to the network 402 illustrated in FIG. 4. It should be appreciated that the configuration of the network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 404A-404D, between each of the server computers 502A-502F in each data center 404, and, potentially, between computing resources 504 in each of the data centers 404. It should be appreciated that the configuration of the data center 404 described with reference to FIG. 5 is merely illustrative and that other implementations can be utilized.

Figure 6:
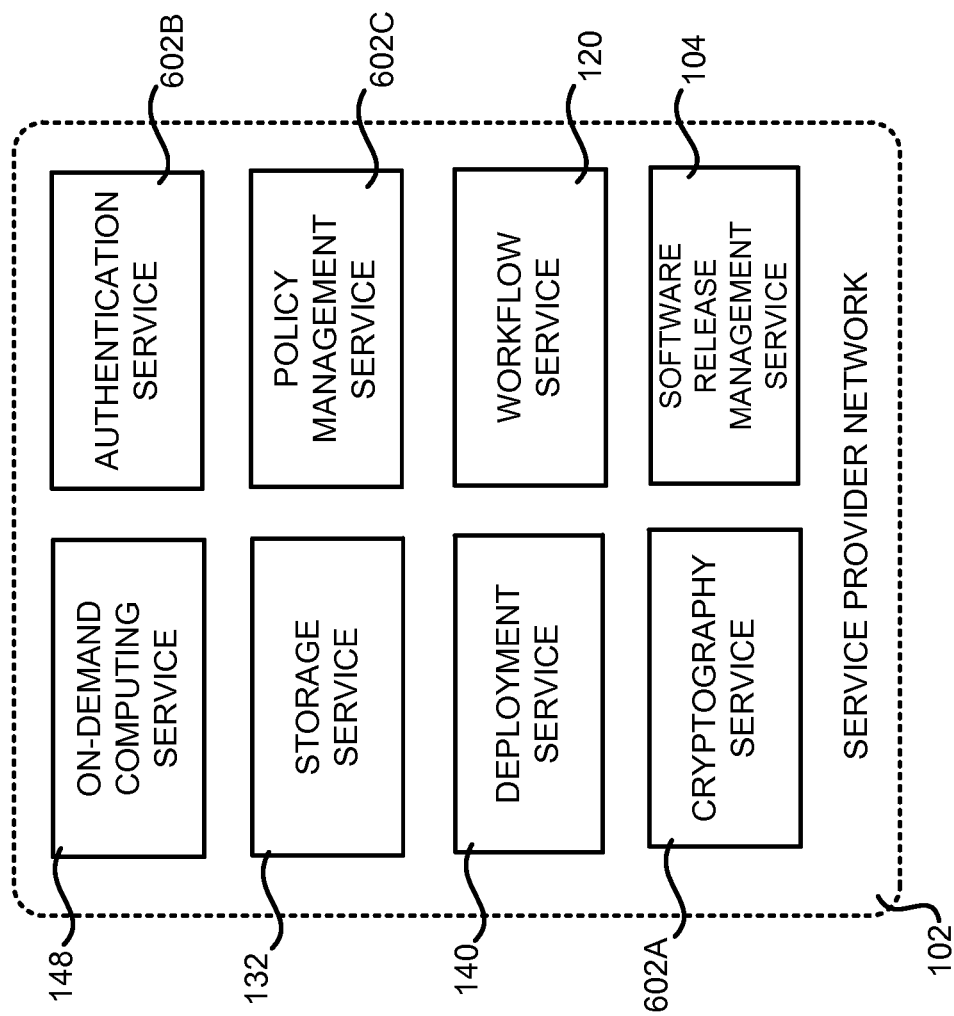
FIG. 6 is a network services diagram that shows aspects of several services that can be provided by and utilized within a service provider network configured to implement the various technologies disclosed herein.

FIG. 6 is a system and network diagram that shows aspects of several network services that can be provided by and utilized within a service provider network 102 in one configuration disclosed herein. In particular, and as discussed above, the service provider network 102 can provide a variety of network services to customers and other users of the service provider network 102 including, but not limited to, the software release management service 104, the database service 114, the storage service 132, the workflow service 120, the internal source code repository 128A, the internal build service 134, the internal on-demand computing service 148, and the internal testing service 152. The service provider network 102 can also provide other types of services including, but not limited to, a cryptography service 602A, an authentication service 602B, and/or a policy management service 802C, each of which is described in greater detail below. Additionally, the service provider network 102 can also provide other types of network services, some of which are also described in greater detail below.

It should be appreciated that customers of the service provider network 102 can include organizations or individuals that utilize some or all of the services provided by the service provider network 102. As described above, a customer or other user can communicate with the service provider network 102 through a network, such as the network 402 shown in FIG. 4. Communications from a customer computing device, such as the developer computing device 108 shown in FIG. 1A, to the service provider network 102 can cause the services provided by the service provider network 102 to operate in accordance with the described configurations or variations thereof.

It is noted that not all configurations described include the services described with reference to FIG. 6 and that additional network services can be provided in addition to or as an alternative to the services explicitly described herein. Each of the services shown in FIG. 6 can also expose Web service interfaces that enable a caller to submit appropriately configured application programming interface ("API") calls to the various services through Web service requests. The various Web services can also expose graphical user interfaces ("GUIs"), command line interfaces ("CLIs"), and/or other types of interfaces for accessing the functionality that they provide. In addition, each of the services can include service interfaces that enable the services to access each other (e.g., to enable a virtual computer system provided by the on-demand computing service 148 to store data in or retrieve data from the data storage service 132). Additional details regarding some of the services shown in FIG. 6 will now be provided.

As discussed above, the on-demand computing service 148 can be a collection of computing resources configured to instantiate VM instances and to provide other types of computing resources 504 on demand. For example, a customer or other user of the service provider network 102 can interact with the on-demand computing service 148 (via appropriately configured and authenticated API calls, for example) to provision and operate VM instances that are instantiated on physical computing devices hosted and operated by the service provider network 102. The VM instances can be used for various purposes, such as to operate as servers supporting the network services described herein, a Web site, to operate business applications or, generally, to serve as computing resources for the customer.

Other applications for the VM instances can be to support database applications, electronic commerce applications, business applications and/or other applications. Although the on-demand computing service 148 is shown in FIG. 6, any other computer system or computer system service can be utilized in the service provider network 102 to implement the functionality disclosed herein, such as a computer system or computer system service that does not employ virtualization and instead provisions computing resources on dedicated or shared computers/servers and/or other physical devices.

The storage service 132 can include software and computing resources that collectively operate to store data using block or file-level storage devices (and/or virtualizations thereof). The storage devices of the storage service 132 can, for example, be operationally attached to virtual computer systems provided by the on-demand computing service 148 to serve as logical units (e.g., virtual drives) for the computer systems. A storage device an also enable the persistent storage of data used/generated by a corresponding virtual computer system where the virtual computer system service can only provide ephemeral data storage.

The service provider network 102 can also include a cryptography service 602B. The cryptography service 602B can utilize storage services of the service provider network 102, such as the storage service 132, to store encryption keys in encrypted form, whereby the keys can be usable to decrypt customer keys accessible only to particular devices of the cryptography service 602A. The cryptography service 602A can also provide other types of functionality not specifically mentioned herein.

As illustrated in FIG. 6, the service provider network 102, in various configurations, also includes an authentication service 602C and a policy management service 602D. The authentication service 602C, in one example, is a computer system (i.e., collection of computing resources 504) configured to perform operations involved in authentication of users. For instance, one of the services shown in FIG. 6 can provide information from a user to the authentication service 602C to receive information in return that indicates whether or not the requests submitted by the user are authentic.

The policy management service 602D, in one example, is a network service configured to manage policies on behalf of customers or internal users of the service provider network 102. The policy management service 602D can include an interface that enables customers to submit requests related to the management of policy. Such requests can, for instance, be requests to add, delete, change or otherwise modify policy for a customer, service, or system, or for other administrative actions, such as providing an inventory of existing policies and the like.

The service provider network 102 can additionally maintain other services based, at least in part, on the needs of its customers. For instance, the service provider network 102 can maintain the deployment service 140 for deploying program code and/or the database service 114 in some configurations. As discussed briefly above, the database service 114 can be a collection of computing resources that collectively operate to create, maintain, and allow queries to be performed on databases stored within the service provider network 102. For example, a customer or other user of the service provider network 102 can operate and manage a database from the database service by utilizing appropriately configured network API calls. This, in turn, can allow the customer to maintain and potentially scale the operations in the database. Other services include object-level archival data storage services, and services that manage, monitor, interact with, or support other services. The service provider network 102 can also be configured with other network services not specifically mentioned herein in other configurations.

Figure 7:
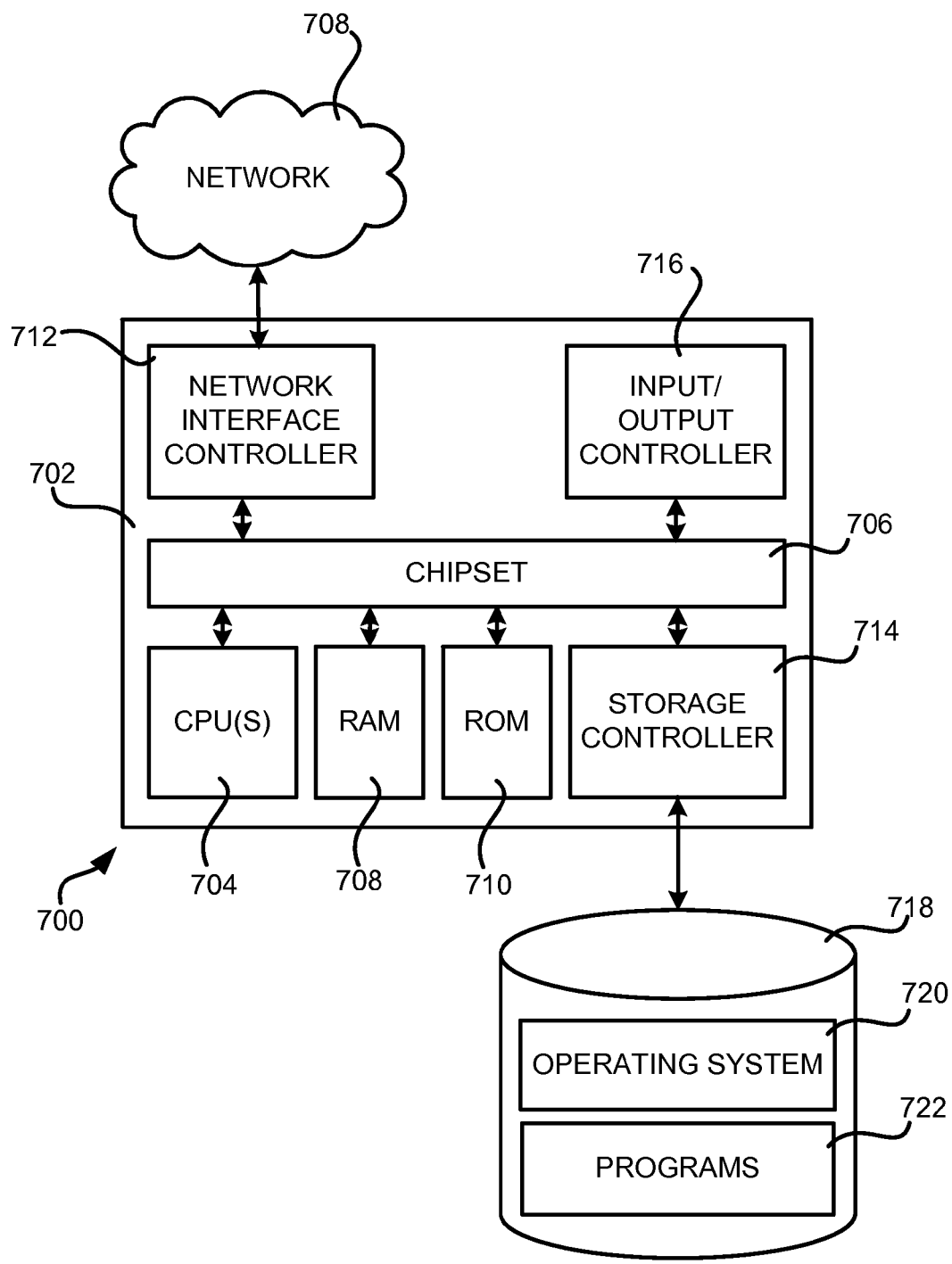
FIG. 7 is a computer architecture diagram showing an illustrative computer hardware architecture for implementing a computing device that can be utilized to implement aspects of the various technologies presented herein.

FIG. 7 shows an example computer architecture for a computer 700 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adderssubtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as the network 708. The chipset 706 can include functionality for providing network connectivity through a NIC 712, such as a gigabit Ethernet adapter. The NIC 712 is capable of connecting the computer 700 to other computing devices over the network 708. It should be appreciated that multiple NICs 712 can be present in the computer 700, connecting the computer to other types of networks and remote computer systems.

The computer 700 can be connected to a mass storage device 718 that provides non-volatile storage for the computer. The mass storage device 718 can store an operating system 720, programs 722, and data, which have been described in greater detail herein. The mass storage device 718 can be connected to the computer 700 through a storage controller 714 connected to the chipset 706. The mass storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the mass storage device 718 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 718 is characterized as primary or secondary storage, and the like.

For example, the computer 700 can store information to the mass storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the mass storage device 718 by detecting the physical states or characteristics of one or more particular locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 718 can store an operating system 720 utilized to control the operation of the computer 700. According to one configuration, the operating system comprises the LINUX operating system. According to another configuration, the operating system comprises the WINDOWS® SERVER operating system from MICROSOFT Corporation. According to further configurations, the operating system can comprise the UNIX operating system or one of its variants. It should be appreciated that other operating systems can also be utilized. The mass storage device 718 can store other system or application programs and data utilized by the computer 700.

In one configuration, the mass storage device 718 or other computer-readable storage media is encoded with computer-executable instructions which, when loaded into the computer 700, transform the computer from a general-purpose computing system into a special-purpose computer capable of implementing the configurations described herein. These computer-executable instructions transform the computer 700 by specifying how the CPUs 704 transition between states, as described above. According to one configuration, the computer 700 has access to computer-readable storage media storing computer-executable instructions which, when executed by the computer 700, perform the various processes described above with regard to FIGS. 1A-3. The computer 700 can also include computer-readable storage media for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, a plotter, or other type of output device. It will be appreciated that the computer 700 might not include all of the components shown in FIG. 7, can include other components that are not explicitly shown in FIG. 7, or can utilize an architecture completely different than that shown in FIG. 7.

The disclosure presented herein also encompasses the subject matter set forth in the following clauses:

Clause 1A: An apparatus, comprising: a processor; and a non-transitory computer-readable storage medium having instructions stored thereupon which are executable by the processor and which, when executed, cause the apparatus to: receive user-specified data defining a software release pipeline, the software release pipeline comprising one or more stages, the one or more stages comprising one or more internal actions and one or more external actions; determine if an internal action or an external action is to be performed during execution of the software release pipeline; in response to determining that an internal action is to be performed, execute an internal job worker associated with the internal action, the internal job worker configured to utilize one or more network services within a service provider network to perform the internal action; and in response to determining that an external action is to be performed, execute an external job worker associated with the external action, the external job worker configured to utilize one or more network services external to the service provider network to perform the external action.

Clause 2A: The apparatus of clause 1A, wherein the external job worker is configured to obtain source code from a source code repository external to the service provider network.

Clause 3A: The apparatus of clauses 1A-2A, wherein the external job worker is configured to cause a build service external to the service provider network to perform a build operation on source code.

Clause 4A: The apparatus of clauses 1A-3A, wherein the external job worker is configured to cause a test service external to the service provider network to perform one or more tests on built program code.

Clause 5A: The apparatus of clauses 1A-4A, wherein the external job worker is configured to cause a deployment service external to the service provider network to deploy build program code.

Clause 6A: A computer-implemented method for executing a software release pipeline in a service provider network, the method comprising: receiving user-specified data defining a software release pipeline, the software release pipeline comprising one or more stages, the one or more stages comprising one or more external actions; determining if an external action is to be performed during execution of the software release pipeline; and in response to determining that an external action is to be performed during execution of the software release pipeline, executing an external job worker associated with the external action, the external job worker configured to utilize one or more network services external to the service provider network to perform the external action.

Clause 7A: The computer-implemented method of clause 6A, wherein the external job worker is configured to obtain source code from a source code repository external to the service provider network.

Clause 8A: The computer-implemented method of clauses 6A-7A, wherein the external job worker is configured to cause a build service external to the service provider network to perform a build operation on source code.

Clause 9A: The computer-implemented method of clauses 6A-8A, wherein the external job worker is configured to cause a test service external to the service provider network to perform one or more tests on built program code.

Clause 10A: The computer-implemented method of clauses 6A-9A, wherein the external job worker is configured to cause a deployment service external to the service provider network to deploy build program code.

Clause 11A: The computer-implemented method of clauses 6A-10A, further comprising: determining whether the external action has failed; and performing one or more user-specified actions responsive to determining that the external action has failed.

Clause 12A: The computer-implemented method of clauses 6A-11A, wherein the external action comprises a test action, and wherein the method further comprising: determining whether the test action has failed; and responsive to determining that the test action has failed, rolling back a deployment of built program code performed by a deploy action executed in the software release pipeline.

Clause 13A. The computer-implemented method of clauses 6A-12A, wherein the one or more stages further comprise one or more internal actions, and wherein the method further comprises: determining if an internal action is to be performed during execution of the software release pipeline; and in response to determining that an internal action is to be performed during execution of the software release pipeline, executing an internal job worker associated with the internal action, the internal job worker configured to utilize one or more network services internal to the service provider network to perform the internal action.

Clause 14A: The computer-implemented method of clauses 6A-13A, wherein the internal job worker comprises an internal source code job worker, an internal build job worker, an internal testing service job worker, or an internal deployment service job worker.

Clause 15A: A non-transitory computer-readable storage medium having instructions stored thereupon which are executable by a processor and which, when executed, cause the processor to: receive user-specified data defining a software release pipeline, the software release pipeline comprising one or more stages, the one or more stages comprising one or more external actions; determine if an external action is to be performed during execution of the software release pipeline; and in response to determining that an external action is to be performed during execution of the software release pipeline, cause an external job worker that is associated with the external action to be executed, the external job worker configured to utilize one or more network services external to the service provider network to implement the external action.

Clause 16A: The non-transitory computer-readable storage medium of clause 15A, wherein the external job worker comprises an external source code job worker, an external build job worker, an external testing service job worker, or an external deployment service job worker.

Clause 17A: The non-transitory computer-readable storage medium of clauses 15A-16A, having further instructions stored thereupon to: determine whether the external action has failed; and cause one or more user-specified actions to be performed in response to determining that the external action has failed.

Clause 18A. The non-transitory computer-readable storage medium of clauses 15A-17A, wherein the external action comprises a test action, and wherein the non-transitory computer-readable storage medium has further instructions stored thereupon to: determine that the test action has failed; and in response to determining that the test action has failed, roll back a deployment of built program code performed by a deploy action executed by the software release pipeline.

Clause 19A: The non-transitory computer-readable storage medium of clauses 15A-18A, wherein the one or more stages further comprise one or more internal actions, and wherein the non-transitory computer-readable storage medium has further instructions stored thereupon to: determine if an internal action is to be performed during execution of the software release pipeline; and in response to determining that an internal action is to be performed during execution of the software release pipeline, cause an internal job worker associated with the internal action to be executed, the internal job worker configured to utilize one or more network services internal to the service provider network to implement the internal action.

Clause 20A: The non-transitory computer-readable storage medium of clauses 15A-20A, wherein the internal job worker comprises an internal source code job worker, an internal build job worker, an internal testing service job worker, or an internal deployment service job worker.

Clause 1B: An apparatus, comprising: a processor; and a non-transitory computer-readable storage medium having instructions stored thereupon which are executable by the processor and which, when executed, cause the apparatus to: receive data defining a software release pipeline, the software release pipeline comprising one or more stages, the one or more stages comprising one or more actions, and one or more user-specified stage gates or action gates; determine if a stage gate or an action gate is encountered during execution of the software release pipeline; in response to encountering the stage gate during execution of the software release pipeline, evaluate the stage gate and start execution of a next stage in the software release pipeline based, at least in part, upon the evaluation of the stage gate; and in response to encountering the action gate during execution of the software release pipeline, evaluate the action gate and start execution of a next action in the software release pipeline based, at least in part, upon the evaluation of the action gate.

Clause 2B: The apparatus of clause 1B, wherein the non-transitory computer-readable storage medium has further instructions stored thereupon to: in response to encountering the stage gate during execution of the software release pipeline, determine if a gate bypass has been specified for the stage gate; and in response to determining that the gate bypass has been specified for the stage gate, starting execution of the next stage in the software release pipeline independently of the evaluation of the stage gate.

Clause 3B: The apparatus of clauses 1B-2B, wherein the non-transitory computer-readable storage medium has further instructions stored thereupon to: in response to encountering the action gate during execution of the software release pipeline, determine if a gate bypass has been specified for the action gate; and in response to determining that the gate bypass has been specified for the action gate, starting execution of the next action in the software release pipeline independently of the evaluation of the stage gate.

Clause 4B: The apparatus of clauses 1B-3B, wherein the one or more stage gates comprise one or more of an approval gate, a time window gate, an alarm gate, or a user-specified gate.

Clause 5B: The apparatus of clauses 1B-4B, wherein the one or more action gates comprise one or more of an approval gate, a time window gate, an alarm gate, or a user-specified gate.

Clause 6B: A computer-implemented method for blocking execution of one or more stages in a software release pipeline, the method comprising: receiving data defining the software release pipeline, the software release pipeline comprising one or more stages, the one or more stages comprising one or more actions, and one or more user-specified stage gates; determining if a stage gate is encountered during execution of the software release pipeline; and responsive to encountering the stage gate during execution of the software release pipeline, evaluating the stage gate and starting execution of a next stage in the software release pipeline based, at least in part, upon the evaluation of the stage gate.

Clause 7B: The computer-implemented method of clause 6B, wherein the stage gate comprises an approval gate specifying an approval that is required in order for the software release pipeline to execute the next stage in the software release pipeline.

Clause 8B: The computer-implemented method of clauses 6B-7B, wherein the stage gate comprises a time window gate specifying one or more time-based restrictions for permitting the release pipeline to execute the next stage in the software release pipeline.

Clause 9B: The computer-implemented method of clauses 6B-8B, wherein the stage gate comprises an alarm gate specifying one or more alarms that must not be present in order for the next stage in the software release pipeline to be executed.

Clause 10B: The computer-implemented method of clauses 6B-9B, wherein the stage gate comprises a user-defined stage gate specifying one or more conditions that must be satisfied before permitting the software release pipeline to execute the next stage in the software release pipeline.

Clause 11B: The computer-implemented method of clauses 6B-10B, wherein the data defining the software release pipeline further defines one or more user-specified action gates, and wherein the method further comprises: determining if an action gate is encountered during execution of the software release pipeline; and responsive to encountering the action gate during execution of the software release pipeline, evaluate the action gate and start execution of a next action in the software release pipeline based, at least in part, upon the evaluation of the action gate.

Clause 12B: The computer-implemented method of clauses 6B-11B, wherein the action gate comprises an approval gate specifying an approval that is required to enable the software release pipeline to execute the next action in the software release pipeline.

Clause 13B: The computer-implemented method of clauses 6B-12B, wherein the action gate comprises a time window gate specifying one or more time-based restrictions for permitting the release pipeline to execute the next action in the software release pipeline.

Clause 14B: The computer-implemented method of clauses 6B-13B, wherein the action gate comprises an alarm gate specifying one or more alarms that must not be present in order for the action in the software release pipeline to be executed.

Clause 15B: The computer-implemented method of clauses 6B-14B, wherein the action gate comprises a user-defined action gate specifying one or more conditions that must be satisfied before permitting the software release pipeline to execute the next action in the software release pipeline.

Clause 16B: A non-transitory computer-readable storage medium having instructions stored thereupon which are executable by a processor and which, when executed, cause the processor to: receive data defining a software release pipeline, the software release pipeline comprising one or more stages, the one or more stages comprising one or more actions, and one or more user-specified action gates; determine if an action gate is encountered during execution of the software release pipeline; and responsive to encountering the action gate during execution of the software release pipeline, evaluate the action gate and start execution of a next action in the software release pipeline based, at least in part, upon the evaluation of the action gate.

Clause 17B: The non-transitory computer-readable storage medium of clause 16B, wherein the action gate comprises an approval gate, a time window gate, an alarm gate, or a user-defined action gate.

Clause 18B: The non-transitory computer-readable storage medium of clauses 16B-17B, wherein the data defining the software release pipeline further defines one or more user-specified stage gates, and wherein the non-transitory computer-readable storage medium has further instructions stored thereupon to: determine if a stage gate is encountered during execution of the software release pipeline; and responsive to encountering the stage gate during execution of the software release pipeline, evaluate the stage gate and start execution of a next stage in the software release pipeline based, at least in part, upon the evaluation of the stage gate.

Clause 19B: The non-transitory computer-readable storage medium of clauses 16B-18B, wherein the stage gate comprises an approval gate, a time window gate, an alarm gate, or a user-defined stage gate.

Clause 20B: The non-transitory computer-readable storage medium of clauses 16B-19B, having further instructions stored thereupon to: evaluate a gate bypass associated with the stage gate prior to starting execution of the next stage in the software release pipeline; or evaluate a gate bypass associated with the action gate prior to starting execution of the next action in the software release pipeline.

Based on the foregoing, it should be appreciated that technologies for managing and automating aspects of the software release lifecycle have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. An apparatus, comprising:
   a processor; and
   a non-transitory computer-readable storage medium having instructions stored thereupon which are executable by the processor and which, when executed, cause the processor to:
   receive data defining a software release pipeline, the software release pipeline comprising:
      one or more stages, the one or more stages each comprising one or more actions;
      one or more stage gates or action gates;
   determine whether a stage gate or an action gate of the one or more stage gates or action gates is encountered during execution of the software release pipeline;
   in response to encountering the stage gate during execution of the software release pipeline:
      determine whether a stage gate bypass is specified for the stage gate;
      based at least in part on a determination that a stage gate bypass is not specified for the stage gate, evaluate the stage gate;
      based at least in part on a determination that the stage gate bypass is specified for the stage get, bypass the stage gate; and
      start execution of a next stage in the software release pipeline based, at least in part, upon the evaluation of the stage gate or a determination that the stage gate bypass is specified for the stage gate; and
   in response to encountering the action gate during execution of the software release pipeline:
      determine whether an action gate bypass is specified for the action gate;
      based at least in part on a determination that an action gate bypass is not specified for the action gate, evaluate the action gate;
      based at least in part on a determination that the action Gate bypass is specified for the stage get, bypass the action gate; and
      start execution of a next action in the software release pipeline based, at least in part, upon the evaluation of the action gate or a determination that the action gate bypass is specified for the stage gate.

2. The apparatus of claim 1, wherein the non-transitory computer-readable storage medium has further instructions stored thereupon to cause the processor to:
   in response to the determination that the state gate bypass has been specified for the stage gate, generate an audit trail comprising data describing processing of the state gate bypass.

3. The apparatus of claim 1, wherein the non-transitory computer-readable storage medium has further instructions stored thereupon to cause the processor to:
   in response to the determination that the action gate bypass has been specified for the action gate, generate an audit trail comprising data describing processing of the action gate bypass.

4. The apparatus of claim 1, wherein the one or more stage gates comprise one or more of an approval gate, a time window gate, an alarm gate, or a user-specified gate.

5. The apparatus of claim 1, wherein the one or more action gates comprise one or more of an approval gate, a time window gate, an alarm gate, or a user-specified gate.

6. A computer-implemented method, the method comprising:
   receiving data defining a software release pipeline, the software release pipeline comprising:
      one or more stages, the one or more stages each comprising one or more actions; and
      one or more stage gates each comprising one or more conditions to be satisfied before a next stage is executed;
   determining if a stage gate of the one or more stage gates is encountered during execution of the software release pipeline; and
   responsive to encountering the stage gate during execution of the software release pipeline:
      determine whether a stage gate bypass is specified for the stage gate;
      based at least in art on a determination that a stage gate bypass is not specified for the stage gate, evaluate the stage gate; and
      starting execution of a respective next stage in the software release pipeline based, at least in part, upon the evaluation of the stage gate or a determination that the stage gate bypass is specified for the stage gate.

7. The computer-implemented method of claim 6, wherein the stage gate comprises an approval gate specifying an approval that is required in order for the software release pipeline to execute the next stage in the software release pipeline.

8. The computer-implemented method of claim 6, wherein the stage gate comprises a time window gate specifying one or more time-based restrictions for permitting the release pipeline to execute the next stage in the software release pipeline.

9. The computer-implemented method of claim 6, wherein the stage gate comprises an alarm gate specifying one or more alarms that must not be present in order for the next stage in the software release pipeline to be executed.

10. The computer-implemented method of claim 6, wherein the stage gate comprises a user-defined stage gate specifying one or more conditions that must be satisfied before permitting the software release pipeline to execute the next stage in the software release pipeline.

11. The computer-implemented method of claim 6, wherein the data defining the software release pipeline further defines one or more action gates, and wherein the method further comprises:
  determining if an action gate is encountered during execution of the software release pipeline prior to execution of an action; and
  responsive to encountering the action gate during execution of the stage of the software release pipeline, evaluate the action gate and start execution of the action in the software release pipeline based, at least in part, upon the evaluation of the action gate.

12. The computer-implemented method of claim 11, wherein the action gate comprises an approval gate specifying an approval that is required to enable the software release pipeline to execute the next action in the software release pipeline.

13. The computer-implemented method of claim 11, wherein the action gate comprises a time window gate specifying one or more time-based restrictions for permitting the release pipeline to execute the next action in the software release pipeline.

14. The computer-implemented method of claim 11, wherein the action gate comprises an alarm gate specifying one or more alarms that must not be present in order for the action in the software release pipeline to be executed.

15. The computer-implemented method of claim 11, wherein the action gate comprises a user-defined action gate specifying one or more conditions that must be satisfied before permitting the software release pipeline to execute the next action in the software release pipeline.

16. A non-transitory computer-readable storage medium having instructions stored thereupon which are executable by a processor and which, when executed, cause the processor to:
  receive data defining a software release pipeline, the software release pipeline comprising:
    one or more stages, the one or more stages comprising one or more actions; and
    one or more action gates each comprising one or more conditions to be satisfied before a next action is executed;
  determine if an action gate is encountered prior to an action during execution of the software release pipeline; and
  responsive to encountering the action gate during execution of the software release pipeline:
    determine whether an action Gate bypass is specified for the action gate;
    based at least in part on a determination that an action gate bypass is not specified for the action gate, evaluate the action gate; and
    start execution of the action in the software release pipeline based, at least in part, upon the evaluation of the action gate or a determination that the action gate bypass is specified for the action gate.

17. The non-transitory computer-readable storage medium of claim 16, wherein the instructions further cause the one or more processors to store results of the execution of the action.

18. The non-transitory computer-readable storage medium of claim 16, wherein the data defining the software release pipeline further defines one or more user-specified stage gates, and wherein the non-transitory computer-readable storage medium has further instructions stored thereupon to:
  determine if a stage gate is encountered during execution of the software release pipeline prior to execution of the stage; and
  responsive to encountering the stage gate during execution of the software release pipeline, evaluate the stage gate and start execution of the stage in the software release pipeline based, at least in part, upon the evaluation of the stage gate.

19. The non-transitory computer-readable storage medium of claim 18, wherein the stage gate comprises an approval gate, a time window gate, an alarm gate, or a user-defined stage gate.

20. The non-transitory computer-readable storage medium of claim 18, having further instructions stored thereupon to:
  evaluate a gate bypass associated with the stage gate prior to starting execution of the stage in the software release pipeline; or
  evaluate a gate bypass associated with the action gate prior to starting execution of the action in the software release pipeline.

* * * * *

UNITED STATES PATENT AND TRADEMARK OFFICE
CERTIFICATE OF CORRECTION

PATENT NO. : 9,934,016 B1  
APPLICATION NO. : 14/869615  
DATED : April 3, 2018  
INVENTOR(S) : Luis Alejandro Acosta et al.

Page 1 of 1

It is certified that error appears in the above-identified patent and that said Letters Patent is hereby corrected as shown below:

On the Title Page

Item (72), delete "Nare Alan Hayrapetyan, ReSeattlenton, WA (US)" and substitute --Nare Hayrapetyan, Seattle, WA (US)--

<div style="text-align:center">

Signed and Sealed this  
Fourteenth Day of August, 2018

Andrei Iancu  
*Director of the United States Patent and Trademark Office*

</div>